United States Patent
Alsalim et al.

(10) Patent No.: US 11,768,599 B2
(45) Date of Patent: Sep. 26, 2023

(54) MANAGING AN ENTERPRISE DATA STORAGE SYSTEM

(71) Applicant: Saudi Arabian Oil Company, Dhahran (SA)

(72) Inventors: Ahmed Saad Alsalim, Dammam (SA); Ali Ahmed Hussain, Safwa (SA)

(73) Assignee: Saudi Arabian Oil Company, Dhahran (SA)

( * ) Notice: Subject to any disclaimer, the term of this patent is extended or adjusted under 35 U.S.C. 154(b) by 210 days.

(21) Appl. No.: 17/374,200

(22) Filed: Jul. 13, 2021

(65) Prior Publication Data

US 2023/0016745 A1    Jan. 19, 2023

(51) Int. Cl.
  *G06F 3/06* (2006.01)
  *G06F 12/0811* (2016.01)

(52) U.S. Cl.
  CPC ............ *G06F 3/0605* (2013.01); *G06F 3/065* (2013.01); *G06F 3/0619* (2013.01); *G06F 3/0622* (2013.01); *G06F 3/0664* (2013.01); *G06F 3/0689* (2013.01); *G06F 12/0811* (2013.01)

(58) Field of Classification Search
  None
  See application file for complete search history.

(56) References Cited

U.S. PATENT DOCUMENTS

| | | | |
|---|---|---|---|
| 5,954,822 A * | 9/1999 | Yashiro | G06F 11/1076 714/E11.034 |
| 6,751,703 B2 * | 6/2004 | Chilton | G06F 12/084 711/113 |
| 8,578,100 B1 | 11/2013 | Huynh et al. | |
| 9,075,754 B1 | 7/2015 | Sadhu | |
| 9,684,601 B2 | 6/2017 | Bottcher et al. | |
| 10,936,436 B2 | 3/2021 | Alsalim | |
| 2003/0093443 A1 | 5/2003 | Huxoll | |

(Continued)

OTHER PUBLICATIONS

Architecting.it [online], "Caching vs Tiering," Aug. 18, 2020, retrieved on May 3, 2021, retrieved from URL <https://www.architecting.it/blog/caclung-tiering/>, 10 pages.

(Continued)

*Primary Examiner* — Kaushikkumar M Patel
(74) *Attorney, Agent, or Firm* — Fish & Richardson P.C.

(57) ABSTRACT

The present disclosure describes a method to manage an enterprise data storage system, the method including: dividing storage disks of the enterprise data storage system into multiple virtual storage subsystems, wherein each virtual storage subsystem hosts a non-overlapping subset of the storage disks, and wherein each virtual storage subsystem includes a level-2 cache memory dedicated thereto; establishing a communication path between the level-2 cache memory dedicated to each virtual storage subsystem and a main cache of the enterprise-level data storage system; and maintaining a copy of transaction data from the non-overlapping subset of the storage disks hosted by each virtual storage subsystem in the level-2 cache memory dedicated thereto such that when the main cache searches for the copy of the transaction data, the main cache fetches, over the communication path, the copy of the transaction data from the level-2 cache memory of the virtual storage subsystem.

18 Claims, 4 Drawing Sheets

(56) References Cited

U.S. PATENT DOCUMENTS

| | | | |
|---|---|---|---|
| 2003/0200388 A1* | 10/2003 | Hetrick | G06F 12/0866 |
| | | | 711/E12.019 |
| 2003/0212870 A1 | 11/2003 | Nowakowski | |
| 2009/0083345 A1 | 3/2009 | Sudo et al. | |
| 2010/0023674 A1* | 1/2010 | Aviles | G06F 12/0813 |
| | | | 711/E12.001 |
| 2011/0022794 A1* | 1/2011 | Jibbe | G06F 12/0873 |
| | | | 711/E12.019 |
| 2015/0347047 A1* | 12/2015 | Masputra | G06F 3/0685 |
| | | | 711/114 |
| 2016/0062671 A1 | 3/2016 | Iwasaki et al. | |
| 2016/0077926 A1 | 3/2016 | Mutalik et al. | |
| 2017/0262217 A1 | 9/2017 | Pradhan et al. | |
| 2017/0315877 A1 | 11/2017 | Kaplingat et al. | |
| 2017/0357559 A1* | 12/2017 | Gade | G06F 11/1435 |
| 2018/0316577 A1 | 11/2018 | Freeman et al. | |
| 2019/0069436 A1* | 2/2019 | Norton | H05K 7/1498 |
| 2019/0095284 A1 | 3/2019 | Balasubramanian et al. | |
| 2019/0278663 A1 | 9/2019 | Bharatkumar et al. | |
| 2020/0371922 A1 | 11/2020 | Bhoria et al. | |
| 2020/0371939 A1 | 11/2020 | Bhoria et al. | |
| 2020/0371948 A1 | 11/2020 | Bhoria et al. | |
| 2021/0374048 A1* | 12/2021 | Wang | G06F 11/1453 |

OTHER PUBLICATIONS

Wikibon.org [online], "Flash Memory Technology in Enterprise Storage," Jan. 8, 2009, retrieved on May 3, 2021, retrieved from URL <http://wikibon.org/wiki/v/Flash_Memory_Technology_in_Enterprise_Storage>, 10 pages.

* cited by examiner

MANAGING AN ENTERPRISE DATA STORAGE SYSTEM

TECHNICAL FIELD

This disclosure generally relates to managing an enterprise data storage system.

BACKGROUND

Commercially available enterprise data storage systems can host data with a total capacity exceeding 1 petabyte. Examples of such enterprise data storage systems can contain large numbers (e.g., hundreds to thousands) of large-capacity physical disks (e.g., 16 terabytes each). The large capacity of such enterprise storage system can introduce additional dimensions of complexity.

SUMMARY

In one aspect, some implementations provide a computer-implemented method to manage an enterprise data storage system. The computer-implemented method includes dividing storage disks of the enterprise data storage system into multiple virtual storage subsystems, wherein each virtual storage subsystem hosts a non-overlapping subset of the storage disks of the enterprise data storage system, wherein each virtual storage subsystem includes a level-2 cache memory dedicated thereto, and wherein the level-2 cache memory includes multiple hardware components; establishing a communication path between the level-2 cache memory dedicated to each virtual storage subsystem and a main cache of the enterprise data storage system; and maintaining a copy of transaction data from the non-overlapping subset of the storage disks hosted by each virtual storage subsystem in the level-2 cache memory dedicated thereto such that when the main cache searches for the copy of transaction data, the main cache fetches, over the communication path, the copy of transaction data from the level-2 cache memory of the virtual storage subsystem.

Implementations may include one or more of the following features.

At least one virtual storage subsystem may cover more than one RAID (redundant array of inexpensive disks) group of disks. The copy of transaction data may represent a unit of data in storage that is most frequently accessed, or most recently used.

The method may further include: when a level-2 cache memory dedicated to a first virtual storage subsystem fails, joining the storage disks of the first virtual storage subsystem with a second virtual storage subsystem such that the storage disks of the first virtual storage subsystem can utilize a level-2 cache memory dedicated to the second virtual storage subsystem. The method may further include: when the level-2 cache memory dedicated to the first virtual storage subsystem is reactivated successfully, automatically rebuilding the first virtual storage subsystem.

The method may additionally include: configuring each virtual storage subsystem such that a copy of parity data for each non-overlapping subset of storage disks is stored in the level-2 cache memory dedicated thereto, wherein the copy of parity data comprises parity information of transaction data stored on each non-overlapping subset of storage disk hosted by each virtual storage subsystem. The method may further include: recovering a parity disk when two or more storage disks hosted by the virtual storage subsystem fail and one of the two or more storage disk is the parity disk of a RAID group. The method may additionally include: based on the recovered parity disk, recovering data in storage at the two or more storage disks hosted by the virtual storage subsystem.

The method may further include: configuring a command interface for a human operator to enter a command such that a hardware component of the level-2 cache memory can be released before the hardware component is physically removed. The method may additionally include: configuring the command interface to include a password challenge such that the human operator is greeted with a password challenge when attempting to release the hardware component. The method may further include: in response to receiving an answer that meets the password challenge, releasing the hardware component. The method may further include: in response to the hardware component being released, suspending an input/output (I/O) data access operation that targets the hardware component; and redirecting the I/O data access operation to a different level-2 cache memory. The method may further include: in response to repeatedly receiving an answer that does meet the password challenge, alerting a handling team of a potential breach.

In another aspect, some implementations provide an enterprise data storage system comprising: a main cache; a plurality of storage disks, wherein the plurality of storage disks are divided into multiple virtual storage subsystems such that each virtual storage subsystem hosts a non-overlapping subset of the plurality of storage disks of the enterprise data storage system; and a plurality of level-2 cache memories, wherein each level-2 cache memory is dedicated to a virtual storage subsystem, wherein each level-2 cache memory includes multiple hardware components, and wherein the enterprise data storage system is configured to maintaining a copy of transaction data from the non-overlapping subset of the storage disks hosted by each virtual storage subsystem in the level-2 cache memory dedicated thereto such that when the main cache searches for the copy of transaction data, the main cache fetches the copy of transaction data from the level-2 cache memory of the virtual storage subsystem.

Implementations may include one or more of the following features.

At least one virtual storage subsystem may cover more than one RAID (redundant array of inexpensive disks) group of disks. The enterprise data storage system may be configured to join the storage disks of a first virtual storage subsystem with a second virtual storage subsystem when a level-2 cache memory dedicated to the first virtual storage subsystem fails. The enterprise data storage system may be further configured to automatically rebuild the first virtual storage subsystem when the level-2 cache memory dedicated to the first virtual storage subsystem is reactivated successfully.

The enterprise data storage system may be configured to store a copy of parity data for each non-overlapping subset of the plurality of storage disks in the level-2 cache memory dedicated thereto. The parity data may comprise parity information of transaction data stored on each non-overlapping subset of storage disk hosted by each virtual storage subsystem. The enterprise data storage system may be configured to provide a command interface for a human operator to enter a command such that a hardware component of the level-2 cache memory can be released before the hardware component is physically removed.

Implementations according to the present disclosure may be realized in computer implemented methods, hardware computing systems, and tangible computer readable media.

For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The details of one or more implementations of the subject matter of this specification are set forth in the description, the claims, and the accompanying drawings. Other features, aspects, and advantages of the subject matter will become apparent from the description, the claims, and the accompanying drawings.

DESCRIPTION OF DRAWINGS

Like reference numbers and designations in the various drawings indicate like elements.

DETAILED DESCRIPTION

The disclosed technology is directed to optimization of a large-scale enterprise-level data storage system, which can often exceed 1 petabyte. Examples of such data storage systems often contain large numbers (e.g., hundreds or even thousands) of physical hard disks, each 16 terabytes or larger. To avoid performance degradation due to the sheer size, two issues need to be addressed. The first issue is the agility of storage system hosting massive data to support enormous number of applications simultaneously. The second issue is the number of disks where the data will be stored. As the number of disks increases, the time required to fetch the data will likely see a concomitant increase, which can lead to degraded user experience.

Implementations of the present disclosure may enhance the response time of a large-scale and enterprise-level data storage system. The enhancement can be independent of the type and the number of storage disks. The implementations may introduce additional dedicated caches for a set of storage disks. Each dedicated cache memory can manage, for example, one or more RAID groups depending on many factors such as type of supported application, type of disks, and the size of the system. The performance of the enterprise storage system can be improved by reducing the response time to the hosted applications. Additionally, implementations of the present disclosure may allow multiple RAID groups to host different type of storage disks. For example, one RAID group can hosts hard drive specs (HDS) 7K physical disks, and the other one hosting 10K or 15K physical disks while the applications that are accessing the system frequently may not notice any differences between the hosted physical disks. Some implementations may initiate new smaller virtual storage subsystems, each have a smaller list of physical disks (one or multiple RAID groups) and new cache memory.

Some implementations may accommodate new caches that can serve a list of physical hard disks. In these implementations, these new caches can be used to keep an additional copy of the parity data of each supported RAID group. This design can add an additional layer to protect storage data and can expedite the recovery time during disk failures. Additionally, this design can allow the removal of the second parity disks from storage systems that are configured with RAID Group (RAID 6).

Some implementations may add an additional step to remove, replace, or reconnect storage cache memories. In one illustration, some implementations can configure a complex combination password for the new caches during the initial storage setup and configuration. The configured password can be used by authorized persons to remove/disconnect production cache. Additionally or alternatively, some implementations may incorporate storage command (for example, command line interface) used by storage administrator to release the hardware part (e.g. cache memory). Thereafter, a hardware engineer can physically remove the hardware part safely from the storage system. Some implementations may include a combination of both complex password and storage command (CLI). These implementations may reduce the chances of losing the cache by human errors, which can cause performance degradation.

In some implementations, if one of the new cache memories has failed, broken, or removed, the least utilized cache memory (level-2) can host these disks automatically. Once the failed cache has been replaced successfully, the old disks group can be rebuild/recreated automatically. This mechanism can avoid direct communication between the main cache memory and storage physical hard disks.

Implementations of the present disclosure can enhance the performance of storage systems hosting gigantic data and supporting a large number of applications. The implementations can also protect RAID group and storage data, expedite the recovery time of disk failures and secure the new physical hardware parts without causing data leakage, data corruption, data loss, slowness in response, and system interruption.

Figure 1:
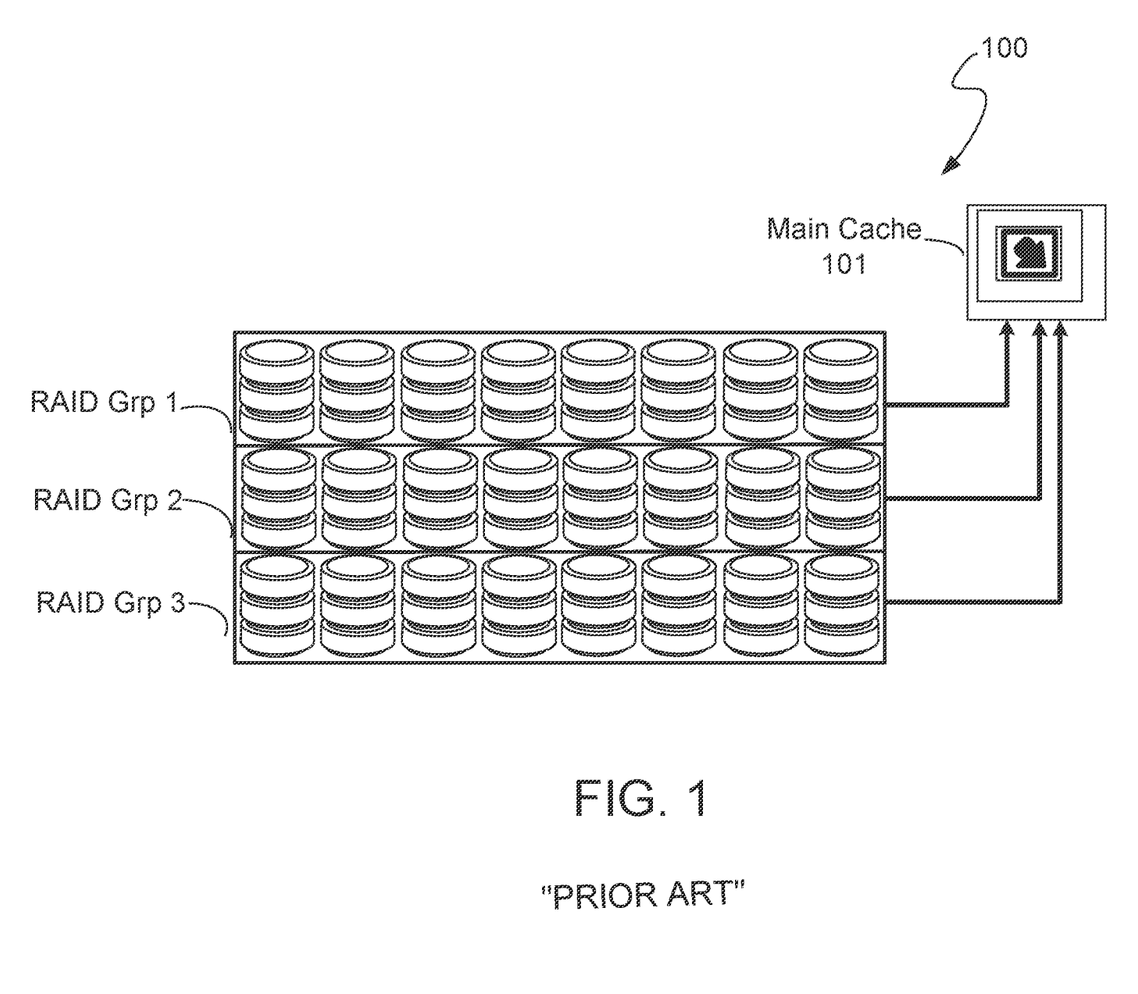
FIG. 1 illustrates an example of a configuration of an enterprise data storage system.
Figure 3:
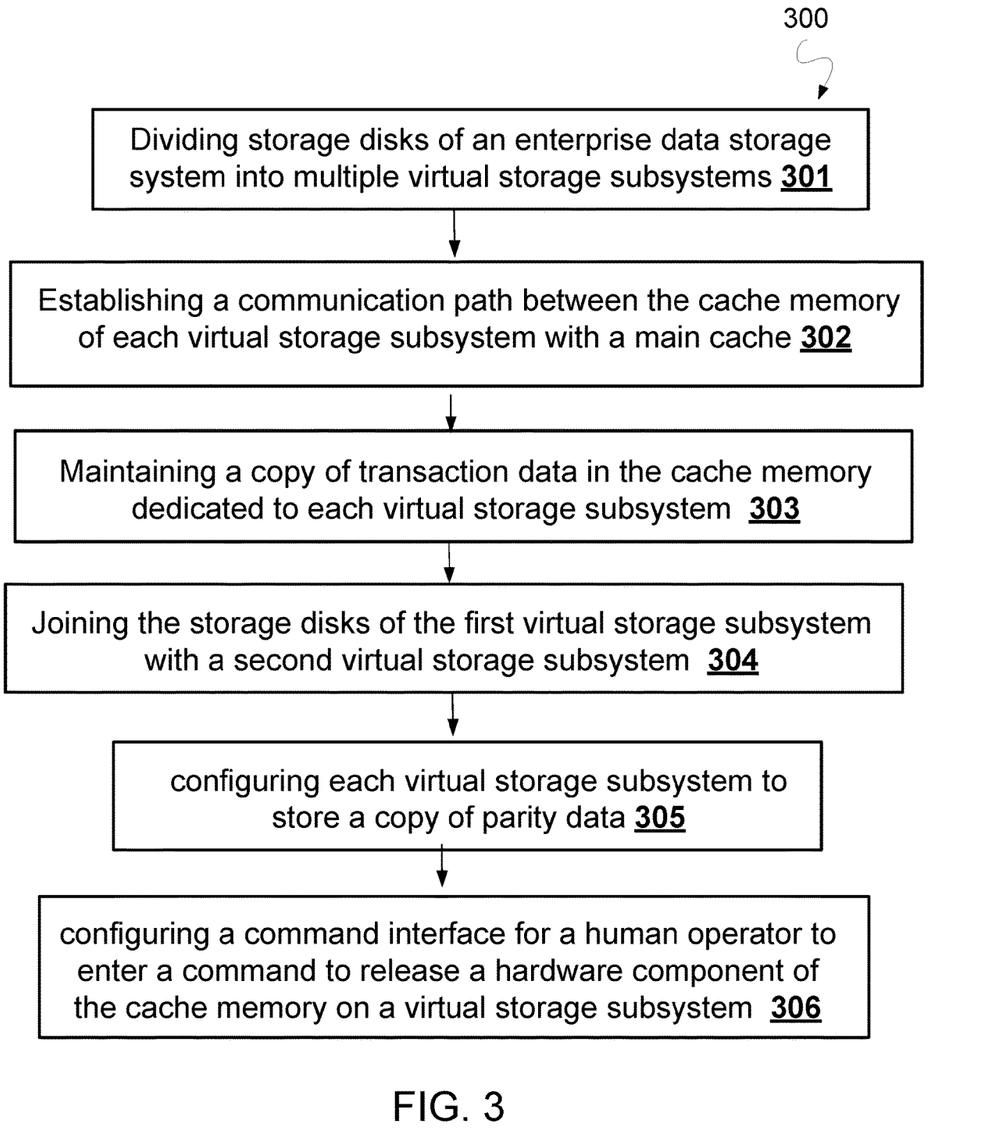
FIG. 3 illustrates an example of a flow chart for operating an enterprise data storage system according to an implementation of the present disclosure.

Referring to FIG. 1, a convention storage system 100 may include main cache 101 and storage disks of several RAID (redundant array of inexpensive disks) groups, namely RAID groups 1, 2, and 3. As used within the confines of this disclosure, the RAID configuration refers to a data storage virtualization technology that combines multiple physical disk drive components into one or more logical units for the purposes of data redundancy, performance improvement, or both. As illustrated in FIG. 3, each RAID group can bundle a number of underlying physical disks together. The underlying physical disks are generally hard disk drives that operate with spinning mechanical parts. Although cost effective, the access speed for reading from and writing to the hard disk drives is generally slower than a solid state drive (SSD). In addition to merging a number of disks into a logic volume so that storage can be spread across the underlying disks, each RAID group may also provide data mirroring and data parity mechanisms to achieve redundancy and enforce data integrity. As illustrated in FIG. 1, the various RAID groups share the main cache 101.

An enterprise-level database storage system can contain a large number of physical disks to host massive volumes of data to support various types of applications including, for example, streaming applications that are bandwidth-intensive and data-intensity. Using a main cache memory to host most frequently accessed data and, in case of a cache miss, searching for the required data on all physical storage hard disks can increase the response time because the data are scattered among multiple disks in a large storage system hosting thousands of disks. The response time can increase proportionally when the number and the size of disks increase. Implementations of the present disclosure can break down the physical storage virtually and initiate multiple virtual storage sub-systems within the same physical storage system. Each virtual storage system can host one newly dedicated cache memory and a smaller list of physical hard disks, as further explained below.

Figure 2:
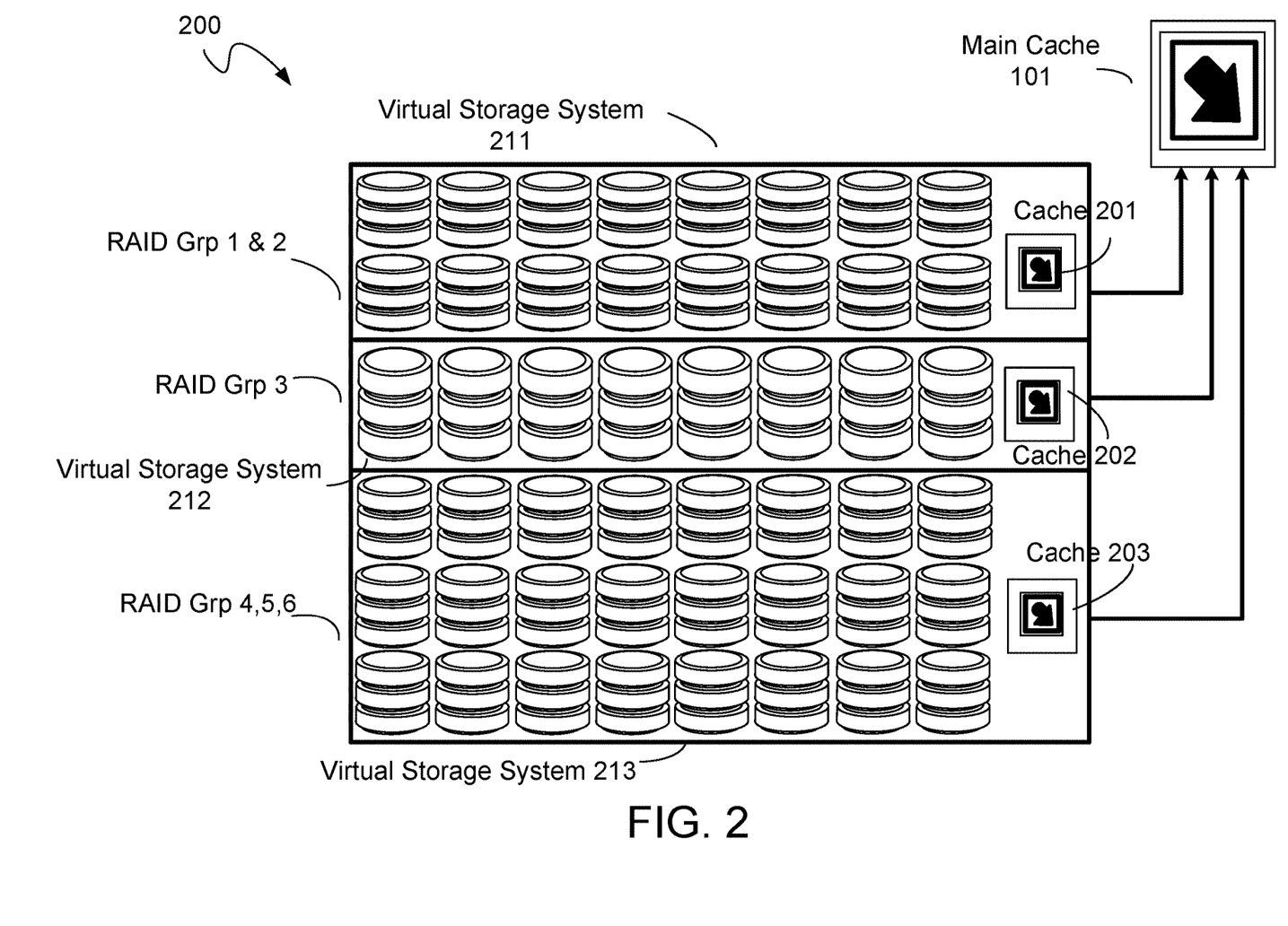
FIG. 2 illustrates an example of a configuration of an enterprise data storage system according to an implementation of the present disclosure.

Referring to FIG. 2, storage disks from RAID group 1 and RAID group 2 can communicate with cache 201, which is configured to serve virtual system 1 that includes both RAID groups 1 and 2. In this illustration, storage disks from RAID group 3 can communicate with cache 202, which is configured to serve virtual storage system 212. Additionally, storage disks from RAID groups 4, 5, and 6 can communicate with cache 203, which is configured to serve virtual storage system 213 that includes RAID groups 4, 5, and 6.

In some implementations of the present disclosure, the physical enterprise storage system virtually is broken down into multiple smaller storage subsystems, each involving a smaller group of physical disks. For example, each storage subsystem can be one RAID group or multiple RAID groups. Each storage subsystem can perform all functions of a separated storage system. In these implementations, the new cache memories can be connected to a set of storage hard disks which host a smaller number of physical disks. As illustrated in FIG. 1, conventional large-scale enterprise-level storage systems use a main cache memory to manage the entire storage system. The main cache is tasked to communicate with the all storage disks. As a result, the main cache can be overwhelmed as the list of use applications keeps growing and the size of the storage system keeps growing. For example, the main cache can enter thrashing mode with significantly increased cache miss rates when the capacity of storage system keeps growing and/or storage disks become larger.

Some implementations may add additional caches, each connected to one or more disks groups. Each added cache can store most frequently used or accessed data by the disk group(s) connected thereto. In contrast, the conventional configuration as illustrated by FIG. 1, may entail additional steps to identify the required data from multiple physical hard disks when the application data are not available in the main cache. In this cases, the response time will be increased proportionally with the number and size of storage hard disks. Hence, having additional cache memories to store the most accessed data for each disk group can enhance the performance in terms of response time. Thereafter, whenever the main cache is searching for application data from any disk groups, the main cache will be able to communicate directly with the new caches which store the more frequently used data of hard disks connected. The new caches therefore serves the purpose of breaking down the large number of storage disks to smaller virtual storage sub-systems.

In various implementations, the communication between the main cache 101 and each added local cache (e.g., caches 201, 202, 203) is between level-1 cache memory and level-2 cache memory. The level-2 cache memory is the new hardware added in front of each group of disks for faster I/O operations. The communication between the main cache and the level-2 cache memories will be through multiple dedicated paths to deliver high performance. Some implementations incorporate hardware parts between the new cache memories and the main cache. The more frequently accessed data from each disk group (e.g., set of storage disks) will be stored in its cache memory. The configuration can expedite the response time between the newly, introduced cache memories and the main cache of the physical storage system. In these implementations, when one of the new cache memories fails, another cache memory can host the group of hardware disks of the impacted cache memory by utilizing the hardware part in the middle.

Implementations can protect each group of disks that are connected to the new cache memories by keeping a copy of parity data in the new cache memory. With conventional RAID configuration, when the parity disk and another disk within the same group have failed or broken, the system will lose all data kept in that list of disks (RAID group or drive box) because these disks may not be recovered. Some implementations incorporate a copy of the parity data in the level-2 cache memory, which can expedite the recovery of the parity disk. Once the parity, disk is recovered, the data disk can be recovered next. Hence, implementations can recover storage data faster when the parity disk fails. Additionally, data can be recovered even when two disks failed within the same disk group, one of which is the parity disk.

Data loss, data corruption, performance degradation or slowness can happen once one or multiple cache memories on enterprise storage systems are removed. Some implementations can secure the new hardware cache memories by executing a storage command to release the hardware part and by adding a complex combination password as the hardware part can be instrumental for hosting critical data. In comparison, conventional configurations would have engineers to have access to the data center, who may remove any hardware part if the physical cabinet is unlocked. Removing online physical cache memory or one part of the cache memory without a well-defined preparation, can result in data corruption or data loss because some data blocks can be lost as such data blocks are still not flushed to the hardware disks. To enforce an orderly hardware removal or replacement of online and production cache memories, some implementations incorporate storage command interface and a complex combination key password. The storage command can be executed by authorized storage administrator. The password combination can be solicited by the management interface by both storage administrator first and by hardware engineer later so that data blocks are flushed from the cache memory to physical hard disks before ongoing data flow is suspended on the targeted hardware part, which other healthy cache is reutilized to replace the targeted hardware part.

In these implementations, after the command is executed by the storage administrator, transaction data that was utilizing the removed/disconnected hardware part can be redirected to safely utilize another healthy cache connected to the storage system. In other words, a different healthy cache memory can now support two disk groups (RAID groups or drive boxes) until, for example, the removed one is reconnected. The connected system or application will not notice that the hardware cache was removed. Instead, the connected system or application will continue sending the transaction data to the storage system with no interruption or slowdown in data access. In conventional configurations, once one or more healthy caches are removed without a proper preparation, the storage system will be impacted causing system degradation, and application that operate on the impacted data will notice a slowed response, and some data can be corrupted or lost. In some cases, if the storage administrator or hardware engineer fail to insert the correct password that is used to unlock storage part for, for example three times in a row, the storage system will recognize that the person attempting to gain access to the hardware cache is not authorized to release the hardware part and remove the cache. In these cases, an alert may be sent to, for example, the storage management team, the monitoring and operation team. Moreover, data center security personnel can be alerted to investigate the incident.

In today's environment, the storage systems hosting high performance storage hard disks (e.g. SSD or flash disks) are very costly and the ones hosting low performance disks (e.g. hard disk drives using serially attached SCSI (SAS) 7K or serial advanced technology attachment (SATA)) may not support most of today live streaming applications. For illustration, hard disk drives may have disks speed in terms of rotation per minute (RPM), such as 7K, 10K, or 15K. Some applications may not be able to utilize slower disks (such as those operating at 7K RPM). Moreover, most of applications using block level SAN storage disks where their data scattered between multiple disks in these storage systems which are hosting large number of disks. When application needs some data, storage system will spend some time to collect the blocks from multiple slower disks. Large storage systems will be accessed by many critical enterprise-level applications such as SAP oil application, SAP core and finance application, SAP medical application, treasury application, and non-SAP oracle applications. When a storage system become bigger by hosting more disks, more and more enterprise-level applications will be hosted by the storage system.

Implementations of the present disclosure may utilize non-expensive disks to enhance storage performance and improve the response time of storage disks. By breaking down the system virtually into multiple smaller subsystems, each virtual subsystem can have its dedicated cache memory to keep the most accessed data within the assigned group of disks. For example, critical applications can be distributed among the virtual subsystems. One of virtual subsystem can host the SAP core and finance application, the other virtual subsystem hosting the SAP oil application. By virtue of this breakdown, the critical data, as frequently uses, will be ready on the cache memory for a specific virtual subsystem. When the main cache memory (level-1) is looking for the data that is not available within the repository of the main cache, the main cache will communicate with the level-2 cache memory where the needed data are kept. In this manner, the main cache memory (level-1) can access requested data faster than the traditional way.

Existing solutions generally utilize two expensive SSD disks for each RAID group while the implementations incorporate one memory for a set of storage disks (supporting multiple RAID groups). The set of storage disks can be one RAID group or multiple groups depend on the hosted applications. Existing solutions are to have two expensive SSD disks for each RAID group, which mean more SSD disks are needed when the system have more RAM groups. The implementations can result in a smaller number of cache memories (level-2) supporting a set of drive boxes, which can be one LAID groups or multiple groups.

Moreover, the implementations can store parity data in the dedicated cache memory for each virtual subsystem. This configuration can reduce the number of drives per RAID group. By storing a copy of parity data in the newly introduced local caches, as illustrated in FIG. 2, the implementations can avoid losing data when two drives within the same RAID group fails (one of the two drives is expected to be the parity drive). Additionally, a complex password combination can be configured to protect the storage cache memories from unauthorized access or accidental removal. In other words, implementations of the present disclosure can provide storage administrator and hardware engineer with the tool set to secure and protect storage systems.

FIG. 3 illustrates a flow chart 300 according to some implementations of the present disclosure. Some implementations may divide the storage disks of an enterprise data storage system into multiple virtual storage subsystems (301). Each virtual storage subsystem can host a non-overlapping subset of the storage disks of the enterprise data storage system. In other words, the storage disks of the enterprise data storage system are broken down into smaller virtual storage subsystems. In these implementations, each virtual storage subsystem includes a level-2 cache memory dedicated thereto. Each virtual storage subsystem can cover more than one RAID (redundant array of inexpensive disks) group of disks.

The implementations may then establish a communication path between the cache memory of each virtual storage subsystem and a main cache of the enterprise data storage system (302). As explained in the context of FIG. 2, the communication between the main cache of the enterprise data storage system and the cache memory of each virtual storage subsystem is between level-1 cache memory and level-2 cache memory. Here, the level-2 cache memory is the new hardware added in front of each group of disks for faster I/O operations.

The implementations can maintain a copy of transaction data in the cache memory dedicated to each virtual storage subsystem (303). The transaction data can be in storage at the non-overlapping subset of the storage disks hosted by each virtual storage subsystem. During operation of the enterprise data storage system, a copy of the transaction data can be stored, for example, in the level-2 cache memory for faster data access. In these examples, the copy of transaction data represents a unit of data in storage that is most frequently accessed, or most recently used. For example, when the main cache searches for the copy of the transaction data and experiences a cache miss, the main cache can fetches, over the communication path, the copy of the transaction data from the level-2 cache memory of the virtual storage subsystem.

The implementations can join the storage disks of a first virtual storage subsystem whose level-2 cache memory has failed with a second virtual storage subsystem (304). In this manner, the storage disks of the first virtual storage subsystem can utilize the level-2 cache memory dedicated to the second virtual storage subsystem. In these implementations, when the level-2 cache memory dedicated to the first virtual storage subsystem is reactivated successfully, the first virtual storage subsystem can be automatically rebuilt to host the previously hosted storage disks.

The implementations may configure each virtual storage subsystem to contain a copy of parity data for the hosting storage disks (305). The copy of parity data can be stored in the level-2 cache memory dedicated to the virtual storage subsystem. The parity data can include parity information of transaction data stored on the storage disks hosted by each virtual storage subsystem. When two or more storage disks hosted by the virtual storage subsystem fail and one of the two or more storage disk is the parity disk of a RAID group, the implementations may recover a parity disk and based on the recovered parity disk, recover data in storage at the two or more storage disks hosted by the virtual storage subsystem.

The implementations may also configure a command interface for a human operator to enter a command to release a hardware component of the level-2 cache memory (306). In general, level-2 cache memories are configured to be larger in capacity than main cache 201. In most cases, access speed to level-2 cache memories can be slower than main cache 201. The implementations may not include additional level-3 cache memories. In these implementations, a system administration can enter the command to release the hardware component before the hardware component can be physically removed. Some configurations may further include a password challenge for the human operator when attempting to release the hardware component. In these configurations, the hardware component may only be released when the human operator successfully answered the password challenge. In response to the hardware component being released, an on-going input/output (i/O) data access operation that targets the hardware component may be suspended. This ongoing I/O data access operation may then be redirected to a different level-2 cache memory. In these configurations, in response to repeatedly receiving an answer that does meet the password challenge, a handling team may be alerted of a potential breach.

Figure 4:
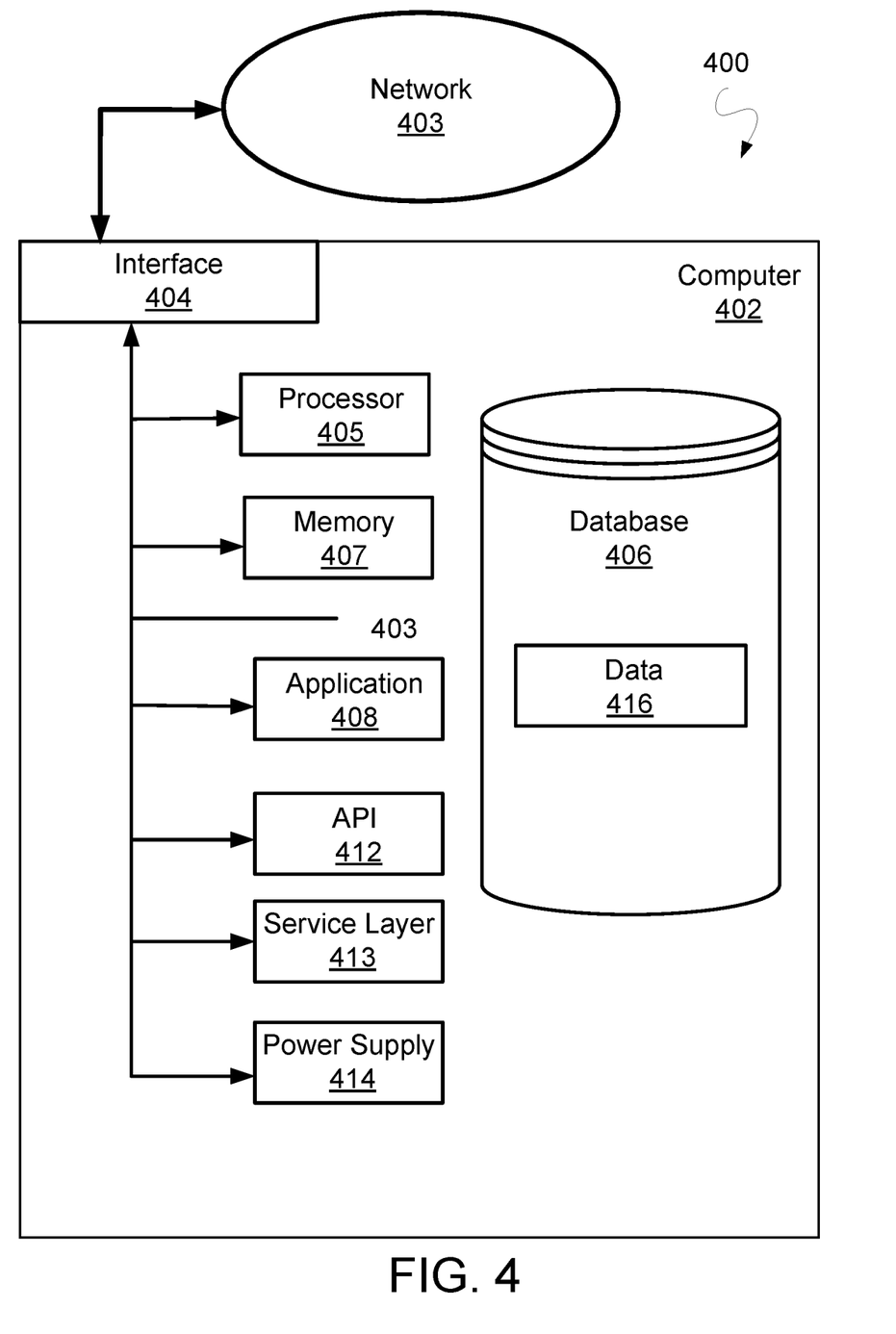
FIG. 4 is a block diagram illustrating an example of a computer system used to provide computational functionalities associated with described algorithms, methods, functions, processes, flows, and procedures, according to an implementation of the present disclosure.

FIG. 4 is a block diagram illustrating an example of a computer system 400 used to provide computational functionalities associated with described algorithms, methods, functions, processes, flows, and procedures, according to an implementation of the present disclosure. The illustrated computer 402 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 402 can comprise a computer that includes an input device, such as a keypad, keyboard, touch screen, another input device, or a combination of input devices that can accept user information, and an output device that conveys information associated with the operation of the computer 402, including digital data, visual, audio, another type of information, or a combination of types of information, on a graphical-type user interface (UI) (or GUI) or other UI.

The computer 402 can serve in a role in a computer system as a client, network component, a server, a database or another persistency, another role, or a combination of roles for performing the subject matter described in the present disclosure. The illustrated computer 402 is communicably coupled with a network 430. In some implementations, one or more components of the computer 402 can be configured to operate within an environment, including cloud-computing-based, local, global, another environment, or a combination of environments.

The computer 402 is an electronic computing device operable to receive, transmit, process, store, or manage data and information associated with the described subject matter. According to some implementations, the computer 402 can also include or be communicably coupled with a server, including an application server, e-mail server, web server, caching server, streaming data server, another server, or a combination of servers.

The computer 402 can receive requests over network 430 (for example, from a client software application executing on another computer 402) and respond to the received requests by processing the received requests using a software application or a combination of software applications. In addition, requests can also be sent to the computer 402 from internal users, external or third-parties, or other entities, individuals, systems, or computers.

Each of the components of the computer 402 can communicate using a system bus 403. In some implementations, any or all of the components of the computer 402, including hardware, software, or a combination of hardware and software, can interface over the system bus 403 using an application programming interface (API) 412, a service layer 413, or a combination of the API 412 and service layer 413. The API 412 can include specifications for routines, data structures, and object classes. The API 412 can be either computer-language independent or dependent and refer to a complete interface, a single function, or even a set of APIs. The service layer 413 provides software services to the computer 402 or other components (whether illustrated or not) that are communicably coupled to the computer 402. The functionality of the computer 402 can be accessible for all service consumers using this service layer. Software services, such as those provided by the service layer 413, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 402, alternative implementations can illustrate the API 412 or the service layer 413 as stand-alone components in relation to other components of the computer 402 or other components (whether illustrated or not) that are communicably coupled to the computer 402. Moreover, any or all parts of the API 412 or the service layer 413 can be implemented as a child or a sub-module of another software module, enterprise application, or hardware module without departing from the scope of the present disclosure.

The computer 402 includes an interface 404. Although illustrated as a single interface 404 in FIG. 4, two or more interfaces 404 can be used according to particular needs, desires, or particular implementations of the computer 402. The interface 404 is used by the computer 402 for communicating with another computing system (whether illustrated or not) that is communicatively linked to the network 430 in a distributed environment. Generally, the interface 404 is operable to communicate with the network 430 and comprises logic encoded in software, hardware, or a combination of software and hardware. More specifically, the interface 404 can comprise software supporting one or more communication protocols associated with communications such that the network 430 or interface's hardware is operable to communicate physical signals within and outside of the illustrated computer 402.

The computer 402 includes a processor 405. Although illustrated as a single processor 405 in FIG. 4, two or more processors can be used according to particular needs, desires, or particular implementations of the computer 402. Generally, the processor 405 executes instructions and manipulates data to perform the operations of the computer 402 and any algorithms, methods, functions, processes, flows, and procedures as described in the present disclosure.

The computer 402 also includes a database 406 that can hold data for the computer 402, another component communicatively linked to the network 430 (whether illustrated or not), or a combination of the computer 402 and another component. For example, database 406 can be an in-memory, conventional, or another type of database storing data consistent with the present disclosure. In some implementations, database 406 can be a combination of two or more different database types (for example, a hybrid in-memory and conventional database) according to particular needs, desires, or particular implementations of the computer 402 and the described functionality. Although illustrated as a single database 406 in FIG. 4, two or more databases of similar or differing types can be used according to particular needs, desires, or particular implementations of the computer 402 and the described functionality. While database 406 is illustrated as an integral component of the computer 402, in alternative implementations, database 406 can be external to the computer 402. As illustrated, the database 406 refers to the examples of an enterprise data storage system. Database 406 can hold the previously described data 416 including, for example, SAP oil application, SAP core and finance application, SAP medical application, treasury application, and non-SAP oracle applications.

The computer 402 also includes a memory 407 that can hold data for the computer 402, another component or components communicatively linked to the network 430 (whether illustrated or not), or a combination of the computer 402 and another component. Memory 407 can store any data consistent with the present disclosure. In some implementations, memory 407 can be a combination of two or more different types of memory (for example, a combination of semiconductor and magnetic storage) according to particular needs, desires, or particular implementations of the computer 402 and the described functionality. Although illustrated as a single memory 407 in FIG. 4, two or more memories 407 or similar or differing types can be used according to particular needs, desires, or particular implementations of the computer 402 and the described functionality. While memory 407 is illustrated as an integral component of the computer 402, in alternative implementations, memory 407 can be external to the computer 402.

The application 408 is an algorithmic software engine providing functionality according to particular needs, desires, or particular implementations of the computer 402, particularly with respect to functionality described in the present disclosure. For example, application 408 can serve as one or more components, modules, or applications. Further, although illustrated as a single application 408, the application 408 can be implemented as multiple applications 408 on the computer 402. In addition, although illustrated as integral to the computer 402, in alternative implementations, the application 408 can be external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion or management circuits (including recharging, standby, or another power management functionality). In some implementations, the power-supply 414 can include a power plug to allow the computer 402 to be plugged into a wall socket or another power source to, for example, power the computer 402 or recharge a rechargeable battery.

There can be any number of computers 402 associated with, or external to, a computer system containing computer 402, each computer 402 communicating over network 430. Further, the term "client," "user," or other appropriate terminology can be used interchangeably, as appropriate, without departing from the scope of the present disclosure. Moreover, the present disclosure contemplates that many users can use one computer 402, or that one user can use multiple computers 402.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of media and memory devices, magnetic devices, magneto optical disks, and optical memory device. Memory devices include semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Magnetic devices include, for example, tape, cartridges, cassettes, internal/removable disks. Optical memory devices include, for example, digital video disc (DVD), CD-ROM, DVD+/−R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback. Input from the user can be received in any form, including acoustic, speech, or tactile input. In addition, a computer can interact with the user by sending documents to and receiving documents from a client computing device that is used by the user.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between networks addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A method to manage an enterprise data storage system, the method comprising:
dividing storage disks of the enterprise data storage system into multiple virtual storage subsystems, wherein each virtual storage subsystem hosts a non-overlapping subset of the storage disks of the enterprise data storage system, wherein each virtual storage subsystem includes a level-2 cache memory dedicated thereto, and wherein the level-2 cache memory includes multiple hardware components;
establishing a communication path between the level-2 cache memory dedicated to each virtual storage subsystem and a main cache of the enterprise data storage system;
maintaining a copy of transaction data from the non-overlapping subset of the storage disks hosted by each virtual storage subsystem in the level-2 cache memory dedicated thereto such that when the main cache searches for the copy of transaction data, the main cache fetches, over the communication path, the copy of transaction data from the level-2 cache memory of the virtual storage subsystem; and
when a level-2 cache memory dedicated to a first virtual storage subsystem fails, joining the storage disks of the first virtual storage subsystem with a second virtual storage subsystem such that the storage disks of the first virtual storage subsystem can utilize a level-2 cache memory dedicated to the second virtual storage subsystem.

2. The method of claim 1, wherein at least one virtual storage subsystem covers more than one RAID (redundant array of inexpensive disks) group of disks.

3. The method of claim 1, wherein the copy of transaction data represents a unit of data in storage that is most frequently accessed, or most recently used.

4. The method of claim 1, further comprising:
when the level-2 cache memory dedicated to the first virtual storage subsystem is reactivated successfully, automatically rebuilding the first virtual storage subsystem.

5. The method of claim 1, further comprising:
configuring each virtual storage subsystem such that a copy of parity data for each non-overlapping subset of storage disks is stored in the level-2 cache memory dedicated thereto, wherein the copy of parity data comprises parity information of transaction data stored on each non-overlapping subset of storage disk hosted by each virtual storage subsystem.

6. The method of claim 5, further comprising:
recovering a parity disk when two or more storage disks hosted by the virtual storage subsystem fail and one of the two or more storage disk is the parity disk of a RAID group.

7. The method of claim 6, further comprising:
based on the recovered parity disk, recovering data in storage at the two or more storage disks hosted by the virtual storage subsystem.

8. The method of claim 1, further comprising:
configuring a command interface for a human operator to enter a command such that a hardware component of the level-2 cache memory can be released before the hardware component is physically removed.

9. The method of claim 8, further comprising:
configuring the command interface to include a password challenge such that the human operator is greeted with a password challenge when attempting to release the hardware component.

10. The method of claim 9, further comprising:
in response to receiving an answer that meets the password challenge, releasing the hardware component.

11. The method of claim 10, further comprising:
in response to the hardware component being released, suspending an input/output (I/O) data access operation that targets the hardware component; and
redirecting the I/O data access operation to a different level-2 cache memory.

12. The method of claim 9, further comprising:
in response to repeatedly receiving an answer that does meet the password challenge, alerting a handling team of a potential breach.

13. An enterprise data storage system comprising
a main cache;
a plurality of storage disks, wherein the plurality of storage disks are divided into multiple virtual storage subsystems such that each virtual storage subsystem hosts a non-overlapping subset of the plurality of storage disks of the enterprise data storage system; and
a plurality of level-2 cache memories, wherein each level-2 cache memory is dedicated to a virtual storage subsystem, wherein each level-2 cache memory includes multiple hardware components, and wherein the enterprise data storage system is configured to maintaining a copy of transaction data from the non-overlapping subset of the storage disks hosted by each virtual storage subsystem in the level-2 cache memory dedicated thereto such that when the main cache searches for the copy of transaction data, the main cache fetches the copy of transaction data from the level-2 cache memory of the virtual storage subsystem, wherein the enterprise data storage system is configured to join the storage disks of a first virtual storage subsystem with a second virtual storage subsystem when a level-2 cache memory dedicated to the first virtual storage subsystem fails.

14. The enterprise data storage system of claim 13, wherein at least one virtual storage subsystem covers more than one RAID (redundant array of inexpensive disks) group of disks.

15. The enterprise data storage system of claim 13, wherein the enterprise data storage system is further configured to automatically rebuild the first virtual storage subsystem when the level-2 cache memory dedicated to the first virtual storage subsystem is reactivated successfully.

16. The enterprise data storage system of claim 13, wherein the enterprise data storage system is configured to store a copy of parity data for each non-overlapping subset of the plurality of storage disks in the level-2 cache memory dedicated thereto.

17. The enterprise data storage system of claim 16, wherein the parity data comprises parity information of transaction data stored on each non-overlapping subset of storage disk hosted by each virtual storage subsystem.

18. The enterprise data storage system of claim 13, wherein the enterprise data storage system is configured to provide a command interface for a human operator to enter a command such that a hardware component of the level-2 cache memory can be released before the hardware component is physically removed.

* * * * *

UNITED STATES PATENT AND TRADEMARK OFFICE
CERTIFICATE OF CORRECTION

PATENT NO. : 11,768,599 B2
APPLICATION NO. : 17/374200
DATED : September 26, 2023
INVENTOR(S) : Ahmed Saad Alsalim and Ali Ahmed Hussain It is certified that error appears in the above-identified patent and that said Letters Patent is hereby corrected as shown below:

On the Title Page

Column 2, Item (56) "Other Publications" section, Line 3, please replace "caclung" with -- caching --.

Signed and Sealed this
Twelfth Day of December, 2023

Katherine Kelly Vidal
*Director of the United States Patent and Trademark Office*